(12) United States Patent
Ono et al.

(10) Patent No.: US 12,249,872 B2
(45) Date of Patent: Mar. 11, 2025

(54) ROTOR, ROTARY MACHINE, AND METHOD FOR MANUFACTURING ROTOR

(71) Applicant: Honda Motor Co., Ltd., Tokyo (JP)

(72) Inventors: Yuji Ono, Saitama (JP); Kaoru Tomioka, Saitama (JP); Keiji Tada, Saitama (JP); Koji Ueda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 17/883,624

(22) Filed: Aug. 9, 2022

(65) Prior Publication Data
US 2023/0094490 A1     Mar. 30, 2023

(30) Foreign Application Priority Data
Sep. 28, 2021    (JP) ................................. 2021-157428

(51) Int. Cl.
    *H02K 1/28*        (2006.01)
    *H02K 1/278*      (2022.01)
    *H02K 15/03*      (2006.01)

(52) U.S. Cl.
    CPC ............... *H02K 1/28* (2013.01); *H02K 1/278* (2013.01); *H02K 15/03* (2013.01)

(58) Field of Classification Search
    CPC .... H02K 1/278; H02K 1/2781; H02K 1/2783; H02K 1/27; H02K 1/2706; H02K 15/03; H02K 1/28; H02K 2201/06
    USPC .......... 310/268, 271, 156.31, 156.28, 156.29
    See application file for complete search history.

(56) References Cited

U.S. PATENT DOCUMENTS

| | | | | |
|---|---|---|---|---|
| 5,477,092 | A * | 12/1995 | Tarrant | H02K 15/03 310/43 |
| 9,413,199 | B2 | 8/2016 | Arimatsu | |
| 2004/0051416 | A1* | 3/2004 | Yamada | F04D 29/053 310/156.28 |
| 2015/0188369 | A1* | 7/2015 | Arimatsu | H02K 1/278 310/156.28 |
| 2019/0109502 | A1* | 4/2019 | Takano | H02K 1/278 |

FOREIGN PATENT DOCUMENTS

| | | |
|---|---|---|
| JP | H08265997 | 10/1996 |
| JP | 2015144550 | 8/2015 |
| JP | 2017163752 | 9/2017 |
| JP | 2018107975 | 7/2018 |

OTHER PUBLICATIONS

"Office Action of Japan Counterpart Application", issued on Jun. 25, 2024, with English translation thereof, p. 1-p. 8.

* cited by examiner

*Primary Examiner* — Alexander A Singh
(74) *Attorney, Agent, or Firm* — JCIPRNET

(57) ABSTRACT

A first layer, a second layer, and a third layer of a sleeve of a rotor are integrated side by side in this order from the radial center of the sleeve toward the outside. The first layer includes a first fiber-reinforced resin including a first carbon fiber extending in a direction inclined with respect to both the axis of the rotor shaft and a circumferential direction of the sleeve. The second layer includes a second fiber-reinforced resin including a second carbon fiber extending along the circumferential direction of the sleeve, the third layer includes a third fiber-reinforced resin including a third carbon fiber extending along the circumferential direction of the sleeve. An elastic modulus of the third layer is larger than an elastic modulus of the second layer.

20 Claims, 7 Drawing Sheets

ROTOR, ROTARY MACHINE, AND METHOD FOR MANUFACTURING ROTOR

CROSS-REFERENCE TO RELATED APPLICATION

This application claims the priority benefit of Japan application serial no. 2021-157428, filed on Sep. 28, 2021. The entirety of the above-mentioned patent application is hereby incorporated by reference herein and made a part of this specification.

BACKGROUND

Technical Field

The disclosure relates to a rotor, a rotary machine, and a method for manufacturing a rotor.

Related Art

In the rotor of a surface magnet type rotary machine, a permanent magnet is disposed on the outer periphery of the rotor shaft. In this type of rotary machine, the centrifugal force generated during the rotation of the rotor applies a force on the permanent magnet in the direction of detachment from the rotor. Therefore, a sleeve is disposed on the outer periphery of the permanent magnet. Since the permanent magnet is held by the sleeve, the permanent magnet is prevented from being detached from the rotor shaft.

For example, Patent Literature 1 proposes a sleeve made of two layers of fiber-reinforced resin whose reinforcing fibers have different orientation directions. Specifically, a hoop winding layer made of a fiber-reinforced resin in which reinforcing fibers are hoop-wound is provided on the inner peripheral part of the sleeve. Further, a helical winding layer made of a fiber-reinforced resin in which reinforcing fibers are helically wound is provided on the outer peripheral part of the hoop winding layer. In this sleeve, the hoop winding layer is provided to ensure the strength of the sleeve, and the helical winding layer is provided to prevent the reinforcing fibers of the hoop winding layer from peeling off.

CITATION LIST

Patent Literature

[Patent Literature 1] Japanese Patent Application Laid-Open No. 2017-163752.

By the way, it is preferable that the sleeve is disposed on the outer periphery of the permanent magnet in a state of being elastically deformed in the direction of increasing the inner diameter of the sleeve. As a result, the permanent magnet is pressed toward the rotor shaft by the elastic restoring force of the sleeve. Therefore, the permanent magnet can be well held on the outer periphery of the rotor shaft. In this case, it is preferable to increase the elastic modulus of the sleeve in order to increase the holding force of the sleeve with respect to the permanent magnet.

On the other hand, if the elastic modulus of the sleeve is increased, there is a concern that the sleeve is likely to break when mounted on the rotor shaft. In particular, the amount of deformation at the inner peripheral part of the sleeve is larger than that at the outer peripheral part. Therefore, if a hoop winding layer that is difficult to be elastically deformed in the diameter increasing direction of the sleeve is provided on the inner peripheral part of the sleeve, there is a concern that the sleeve is more likely to break.

That is, it is difficult to mount the sleeve on the rotor shaft while suppressing the breakage of the sleeve and to satisfactorily press the permanent magnet toward the rotor shaft by the elastic restoring force of the sleeve. As a result, it is difficult to hold the permanent magnet well on the outer periphery of the rotor shaft.

In view of the above, the disclosure provides the following configurations.

SUMMARY

An embodiment of the disclosure provides a rotor including: a rotor shaft rotatable about an axis; a permanent magnet disposed on an outer periphery of the rotor shaft; and a sleeve disposed on an outer periphery of the permanent magnet and pressing the permanent magnet toward the rotor shaft. The sleeve includes a first layer, a second layer, and a third layer disposed concentrically in an axial direction of the sleeve. The first layer, the second layer, and the third layer are integrated side by side in this order from a radial center of the sleeve toward an outside. The first layer includes a first fiber-reinforced resin including a first carbon fiber extending in a direction inclined with respect to both the axis of the rotor shaft and a circumferential direction of the sleeve. The second layer includes a second fiber-reinforced resin including a second carbon fiber extending along the circumferential direction of the sleeve. The third layer includes a third fiber-reinforced resin including a third carbon fiber extending along the circumferential direction of the sleeve. An elastic modulus of the third layer is larger than an elastic modulus of the second layer.

Another embodiment of the disclosure provides a rotary machine including the rotor and a stator facing an outer periphery of the rotor at a distance from each other.

Still another embodiment of the disclosure provides a manufacturing method for a rotor. The rotor includes: a rotor shaft rotatable about an axis; a permanent magnet disposed on an outer periphery of the rotor shaft; and a sleeve disposed on an outer periphery of the permanent magnet and pressing the permanent magnet toward the rotor shaft. The manufacturing method includes: a providing process of providing the rotor shaft in which the permanent magnet is disposed on the outer periphery and the sleeve before mounted on the rotor shaft; and a mounting process of mounting the sleeve on the outer periphery of the permanent magnet of the rotor shaft. The sleeve prepared in the providing process includes a first layer, a second layer, and a third layer disposed concentrically. The first layer, the second layer, and the third layer are integrated side by side in this order from a radial center of the sleeve toward an outside. The first layer includes a first fiber-reinforced resin including a first carbon fiber extending in a direction inclined with respect to both an axial direction of the sleeve and a circumferential direction of the sleeve. The second layer includes a second fiber-reinforced resin including a second carbon fiber extending along the circumferential direction of the sleeve. The third layer includes a third fiber-reinforced resin including a third carbon fiber extending along the circumferential direction of the sleeve. An elastic modulus of the third layer is larger than an elastic modulus of the second. An inner diameter of the sleeve before mounted on the rotor shaft is smaller than an outer diameter of a part of the rotor shaft including the permanent magnet. In the mounting process, the rotor shaft is inserted into the sleeve, and the sleeve is elastically deformed in a direction of increasing the inner diameter of the sleeve, and the sleeve is mounted to the rotor shaft while sliding the first layer and an outer peripheral surface of the permanent magnet by making the axial direction of the sleeve be along an extending direction of the axis of the rotor shaft.

DESCRIPTION OF THE EMBODIMENTS

Figure 1:
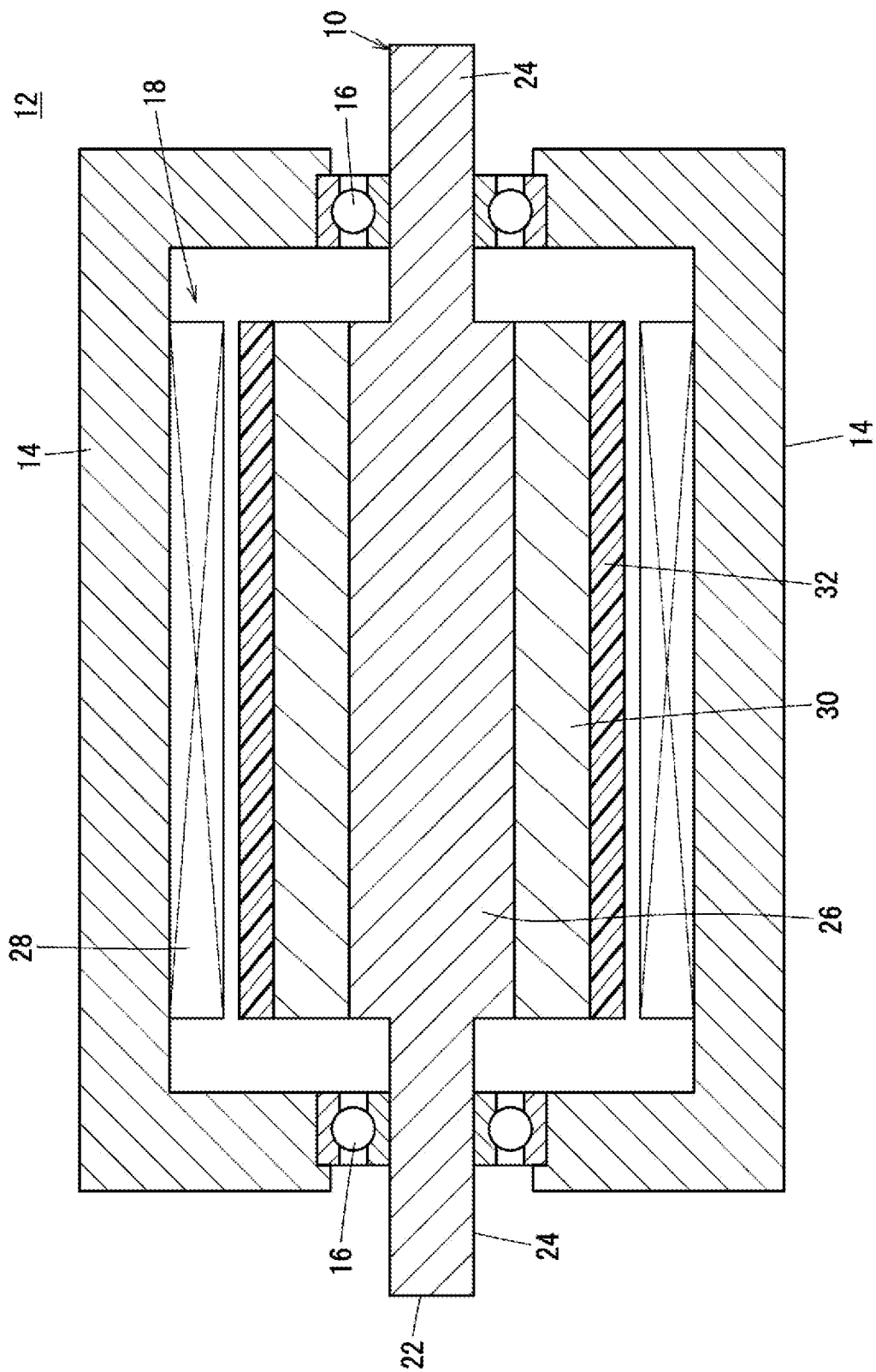
FIG. 1 is a schematic cross-sectional view of a rotary machine including a rotor according to an embodiment of the disclosure.

The first layer, the second layer, and the third layer of the sleeve are integrated side by side in this order from the radial center of the sleeve toward the outside. When the rotor shaft is inserted into the sleeve, the amount of deformation of the sleeve in the direction in which the inner diameter of the sleeve is increased (hereinafter also referred to as the diameter increasing direction) increases as it is closer to the radial center of the sleeve. That is, the amount of deformation of the sleeve in the diameter increasing direction is the largest in the first layer and the smallest in the third layer.

The first fiber-reinforced resin of the first layer includes the first carbon fiber extending in a direction inclined with respect to both the axis of the rotor shaft and the circumferential direction of the sleeve. Therefore, in the first layer, for example, the carbon fiber is more easily elastically deformed in the diameter increasing direction than the fiber-reinforced resin layer (hoop winding layer) extending along the peripheral direction of the sleeve. Therefore, as described above, when the rotor shaft is inserted into the sleeve, it is possible to effectively prevent the first layer from breaking even if the amount of deformation of the first layer in the diameter increasing direction is large.

The second fiber-reinforced resin of the second layer includes the second carbon fiber extending along the circumferential direction of the sleeve. Therefore, the second layer has a larger elastic modulus (rigidity) in the diameter increasing direction than the first layer. Further, the third fiber-reinforced resin of the third layer includes the third carbon fiber extending along the circumferential direction of the sleeve. Further, the elastic modulus of the third layer is larger than the elastic modulus of the second layer. That is, in the sleeve, the elastic modulus becomes larger as the amount of deformation in the diameter increasing direction when the rotor shaft is inserted into the sleeve becomes smaller. Therefore, the second layer and the third layer are also prevented from breaking when the rotor shaft is inserted into the sleeve. Further, in the sleeve after being mounted on the rotor shaft, it becomes possible to satisfactorily hold the permanent magnet on the outer periphery of the rotor shaft since the second layer has a larger elastic modulus than that of the first layer, and the third layer has a larger elastic modulus than that of the second layer.

That is, according to the disclosure, it is possible to mount the sleeve on the rotor shaft while suppressing the breakage of the sleeve and to satisfactorily press the permanent magnet toward the rotor shaft by the elastic restoring force of the sleeve. As a result, the permanent magnet can be satisfactorily held on the outer periphery of the rotor shaft.

In the following figures, components having the same or similar functions and effects may be designated by the same reference numerals, and repeated description may be omitted.

As shown in FIG. 1, a rotor 10 according to this embodiment configures a part of a rotary machine 12. In addition to the rotor 10, the rotary machine 12 includes a motor case 14, a bearing 16, and a stator 18. The motor case 14 rotatably supports a rotor shaft 22 of the rotor 10 via a set of bearings 16. As a result, the rotor shaft 22 can rotate around the axis. The set of bearings 16 are spaced apart from each other in the axial direction of the rotor shaft 22. Hereinafter, the direction along the axis of the rotor shaft 22 is also referred to as the axial direction of the rotor shaft 22.

The rotor shaft 22 has a main body part 26 and a pair of small diameter parts 24. The pair of small diameter parts 24 are provided at both ends in a direction along the axis of the rotor shaft 22 (hereinafter, also referred to as an axial direction of the rotor shaft 22). The main body part 26 has an outer diameter larger than that of the small diameter part 24, and is provided between the small diameter parts 24 of the rotor shaft 22 (the center part in the axial direction of the rotor shaft 22). Each of the pair of small diameter parts 24 of the rotor shaft 22 is supported by the bearing 16. Further, the part of the rotor shaft 22 between the parts supported by the set of bearings 16 is housed inside the motor case 14.

The stator 18 is housed inside the motor case 14. The stator 18 has an electromagnetic coil 28 and a stator core (not shown). Inside the motor case 14, the electromagnetic coil 28 and the stator core face each other at a distance from the outer periphery of the rotor 10.

Figure 2:
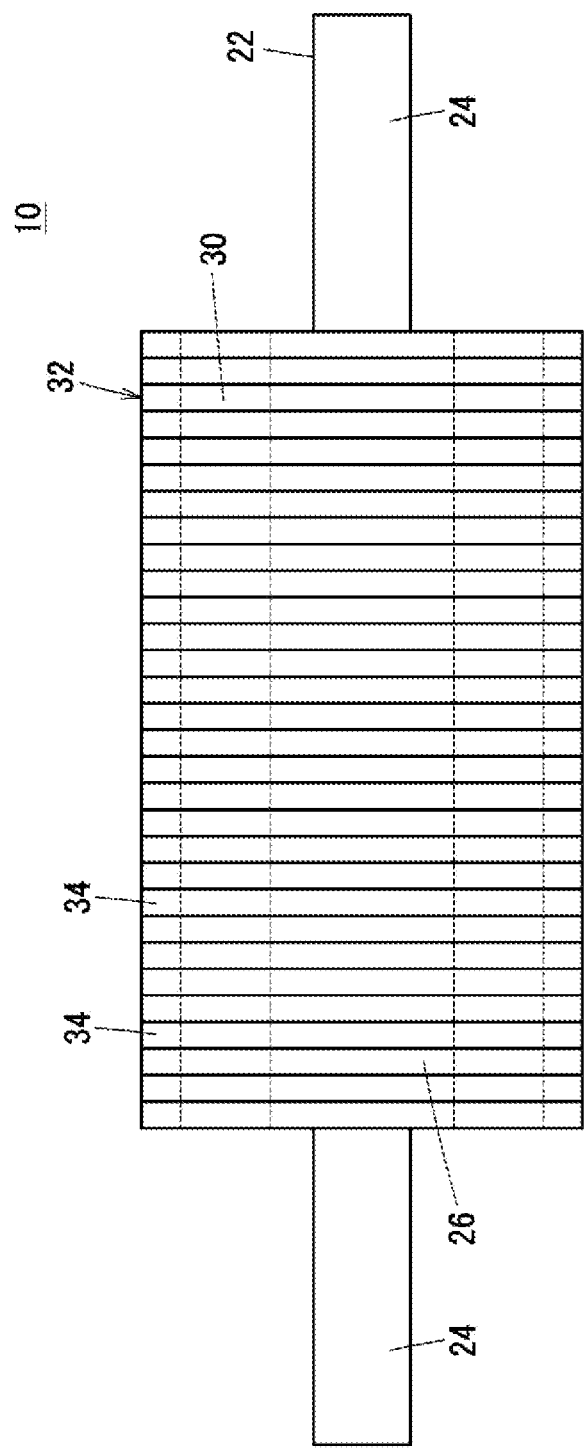
FIG. 2 is a schematic side view of the rotor.
Figure 3:
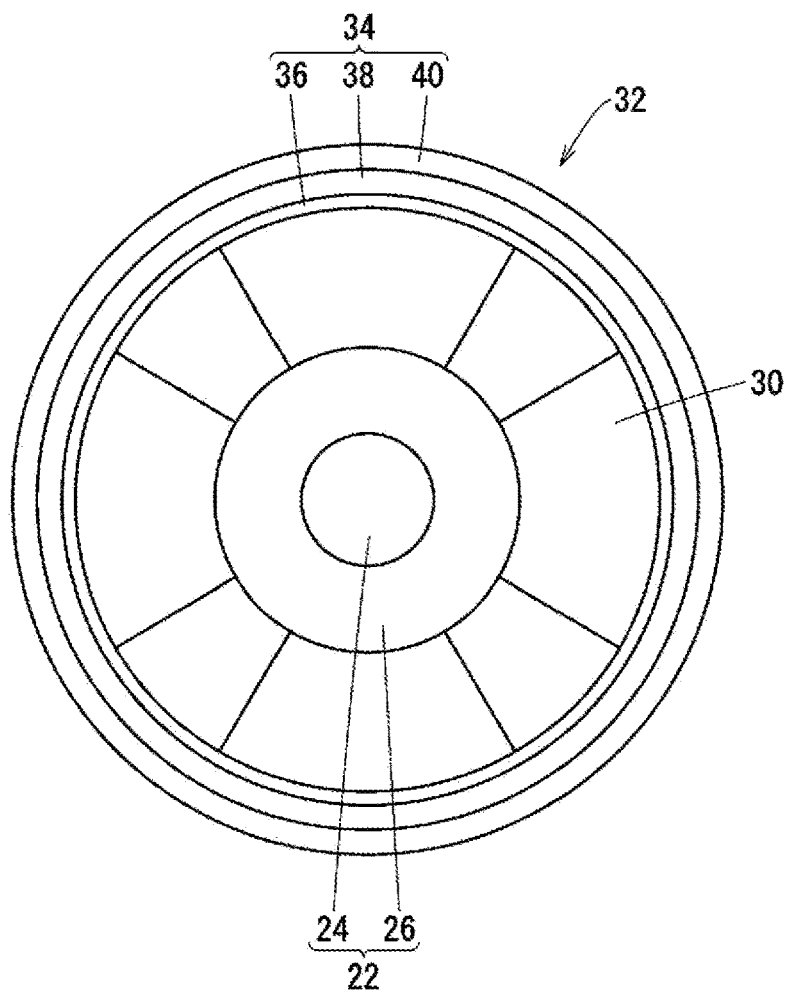
FIG. 3 is an end view of the rotor of FIG. 2 when viewed in the axial direction.

As shown in FIGS. 1 to 3, the rotor 10 has a rotor shaft 22, a permanent magnet 30, and a sleeve 32. The rotor shaft 22 has an outer periphery of a part (main body part 26) facing the stator 18. The permanent magnet 30 is attached to the outer periphery of the rotor shaft 22. The sleeve 32 is disposed on the outer periphery of the permanent magnet 30. The sleeve 32 presses the permanent magnet 30 toward the rotor shaft 22. As a result, the sleeve 32 holds the permanent magnet 30 on the outer periphery of the rotor shaft 22.

In this embodiment, the inner diameter of the sleeve 32 is smaller than the diameter of the part of the rotor shaft 22 including the permanent magnet 30. Therefore, the sleeve 32 is disposed on the outer periphery of the permanent magnet 30 in a state of being elastically deformed in the direction of increasing the inner diameter of the sleeve 32. That is, the permanent magnet 30 is pressed toward the rotor shaft 22 by the elastic restoring force of the sleeve 32.

As shown in FIGS. 2 and 3, the sleeve 32 has multiple annular ring members 34. The ring members 34 are stacked on each other in the axial direction of the rotor shaft 22. As a result, the sleeve 32 has a cylindrical shape as a whole. The cylindrical sleeve 32 is disposed coaxially with the rotor shaft 22. As shown in FIG. 3, each ring member 34 configuring the sleeve 32 has a first layer 36, a second layer 38, and a third layer 40 disposed concentrically in the axial direction of the sleeve 32. The first layer 36, the second layer 38, and the third layer 40 are integrated side by side in this order from the radial center of the sleeve 32 toward the outside. Therefore, the second layer 38 is disposed outside the first layer 36. The third layer 40 is disposed outside the second layer 38.

The first layer 36 has a first fiber-reinforced resin. The first fiber-reinforced resin includes a first matrix resin and a first carbon fiber. Preferable examples of the first matrix resin include, but are not particularly limited to, epoxy resin, cyanate ester resin, vinyl ester resin, or a mixed resin in which at least two or more selected from these resins are mixed. The first carbon fiber extends in a direction inclined with respect to both the axis of the rotor shaft 22 (the axial direction of the sleeve 32) and the circumferential direction of the sleeve 32. That is, the first carbon fiber is so-called helically wound. The angle at which the extending direction of the first carbon fiber is inclined with respect to the axis of the rotor shaft 22 (hereinafter, also referred to as an inclination angle) is preferably 30° to 40° (the reason will be described later).

The second layer 38 has a second fiber-reinforced resin. The second fiber-reinforced resin includes a second matrix resin and a second carbon fiber. Preferable examples of the second matrix resin include, but are not particularly limited to, epoxy resin, cyanate ester resin, vinyl ester resin, or a mixed resin in which at least two or more selected from these resins are mixed. The second carbon fiber extends along the circumferential direction of the sleeve 32. That is, the second carbon fiber is so-called hoop-wound.

The third layer 40 has a third fiber-reinforced resin. The third fiber-reinforced resin includes a third matrix resin and a third carbon fiber. Preferable examples of the third matrix resin include, but are not particularly limited to, epoxy resin, cyanate ester resin, vinyl ester resin, or a mixed resin in which at least two or more selected from these resins are mixed. The third carbon fiber extends along the circumferential direction of the sleeve 32. That is, the third carbon fiber is so-called hoop-wound. Here, in the fiber-reinforced resin, the strength of the reinforced fiber in the extending direction is effectively enhanced. Therefore, each of the second layer 38 in which the second carbon fiber is hoop-wound and the third layer 40 in which the third carbon fiber is hoop-wound exhibit particularly high strength in the circumferential direction of the ring member 34. That is, the second layer 38 and the third layer 40 show high strength in the direction of the centrifugal force applied to the permanent magnet 30 when the rotor 10 rotates.

The elastic modulus of the third layer 40 is larger than the elastic modulus of the second layer 38. The elastic modulus of the second layer 38 is the tensile elastic modulus in the circumferential direction of the second layer 38. The elastic modulus of the third layer 40 is the tensile elastic modulus in the circumferential direction of the third layer 40. Further, it is preferable that the elongation rate in the circumferential direction of the third layer 40 is smaller than the elongation rate in the circumferential direction of the second layer 38. The elastic modulus and elongation rate of the third layer 40 may be adjusted, for example, by selecting the type of the third carbon fiber. Further, the elastic modulus and the elongation rate of the second layer 38 may be adjusted, for example, by selecting the type of the second carbon fiber.

In each ring member 34, it is preferable that when the thickness of the first layer 36 is 1, the total thickness of the thickness of the second layer 38 and the thickness of the third layer 40 is 7.9 to 28.7 (the reason will be described later). In this case, for example, the thickness of the first layer 36 is preferably 0.2 to 0.3 mm. Further, the total thickness of the second layer 38 and the third layer 40 is preferably 2.37 to 5.73 mm. The axial length of each ring member 34 is preferably 3.3 to 12.0 mm. A more preferable axial length of each ring member 34 is 6.0 to 8.0 mm.

The rotor 10 is basically configured as described above. Hereinafter, a method for manufacturing the rotor 10 according to this embodiment will be described with reference to FIGS. 4 to 7. In the method for manufacturing the rotor 10, first, a providing process is performed. In the providing process, the rotor shaft 22 (FIG. 4) in which the permanent magnet 30 is disposed on the outer periphery and the sleeve 32 (ring member 34 in FIG. 5) before being mounted on the rotor shaft 22 are provided. In this embodiment, the sleeve 32 provided in the providing process is multiple ring members 34 before being mounted on the rotor shaft 22.

Figure 4:
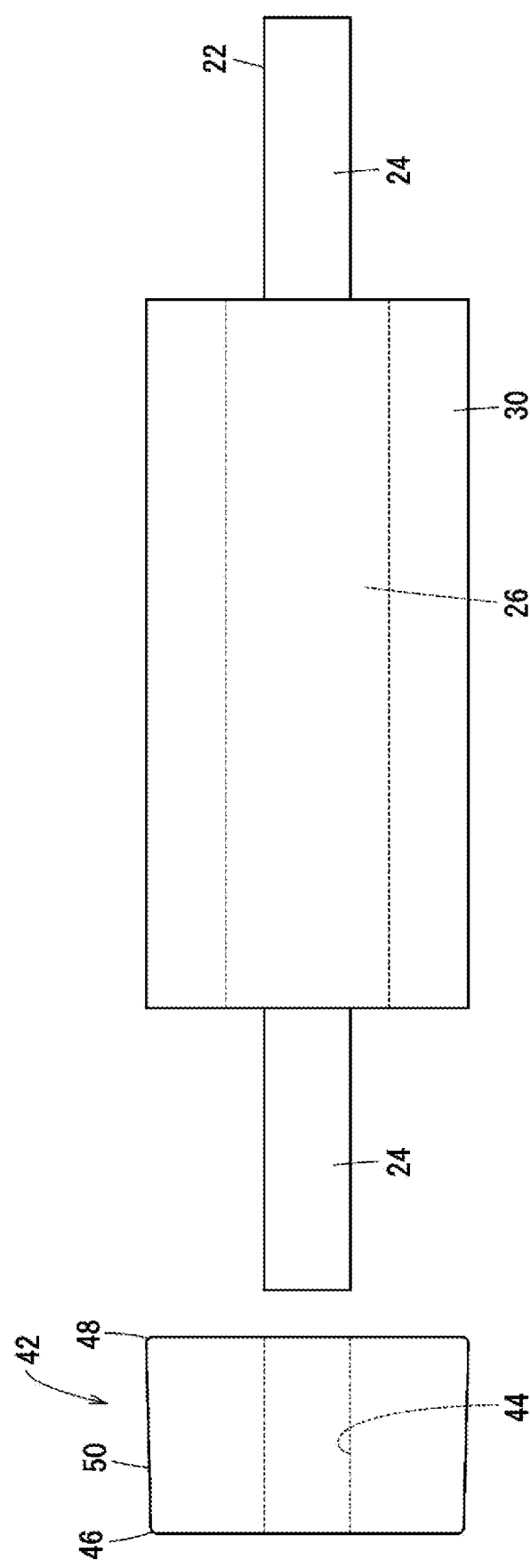
FIG. 4 is a schematic side view of a rotor shaft in which a permanent magnet is disposed on the outer periphery and a mounting jig before being attached to the rotor shaft.
Figure 5:
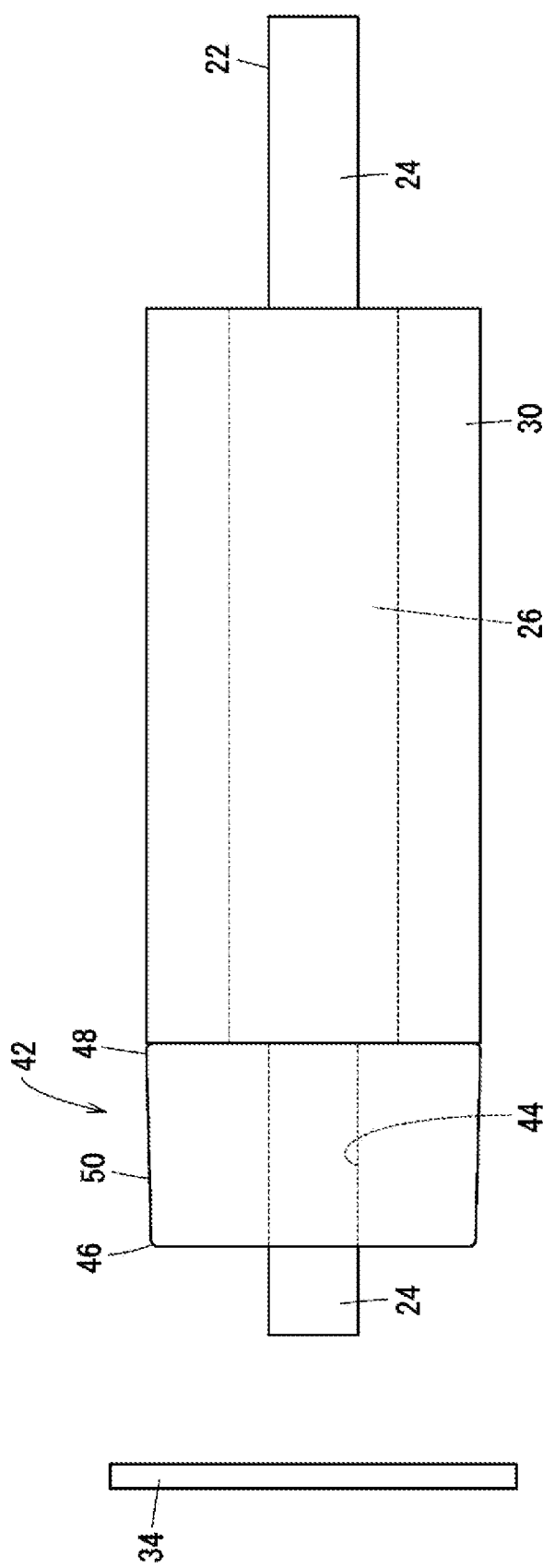
FIG. 5 is an illustration view illustrating a jig mounting process for mounting a mounting jig on a rotor shaft.

Next, the jig mounting process is performed. As shown in FIGS. 4 and 5, in the jig mounting process, a mounting jig 42 is mounted at one end of the rotor shaft 22 in the extending direction. In this embodiment, the mounting jig 42 is provided with an insertion hole 44 along the axial direction of the mounting jig 42. The mounting jig 42 is attached to the rotor shaft 22 by inserting one of the small diameter parts 24 of the rotor shaft 22 into the insertion hole 44.

The mounting jig 42 has a small diameter part 46, a large diameter part 48, and a tapered part 50. The outer diameter of the small diameter part 46 is equal to or less than the inner diameter of the sleeve 32 (each ring member 34) before being mounted on the rotor shaft 22. The outer diameter of the large diameter part 48 is the same as the outer diameter of the part of the rotor shaft 22 including the permanent magnet 30. The "same diameter" here includes the case where the outer diameter of the large diameter part 48 and the outer diameter of the part of the rotor shaft 22 including the permanent magnet 30 are substantially the same.

The tapered part 50 is tapered from the large diameter part 48 toward the small diameter part 46. When the mounting jig 42 is mounted on the rotor shaft 22, the large diameter part 48 of the mounting jig 42 is disposed so as to be continuously adjacent to the part of the rotor shaft 22 including the permanent magnet 30. That is, the small diameter part 46 of the mounting jig 42 is disposed closer to one end of the rotor shaft 22 than the large diameter part 48.

Figure 6:
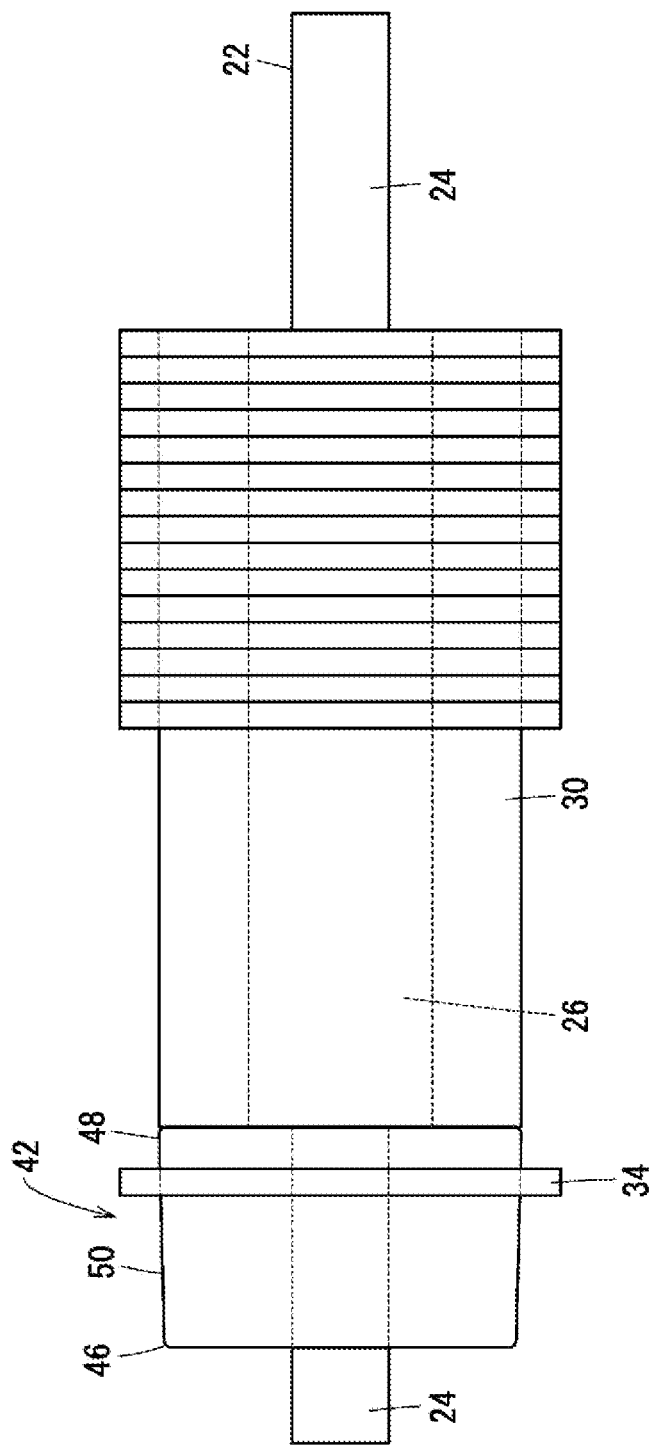
FIG. 6 is an illustration view illustrating a mounting process of mounting a ring member on a rotor shaft via a mounting jig.
Figure 7:
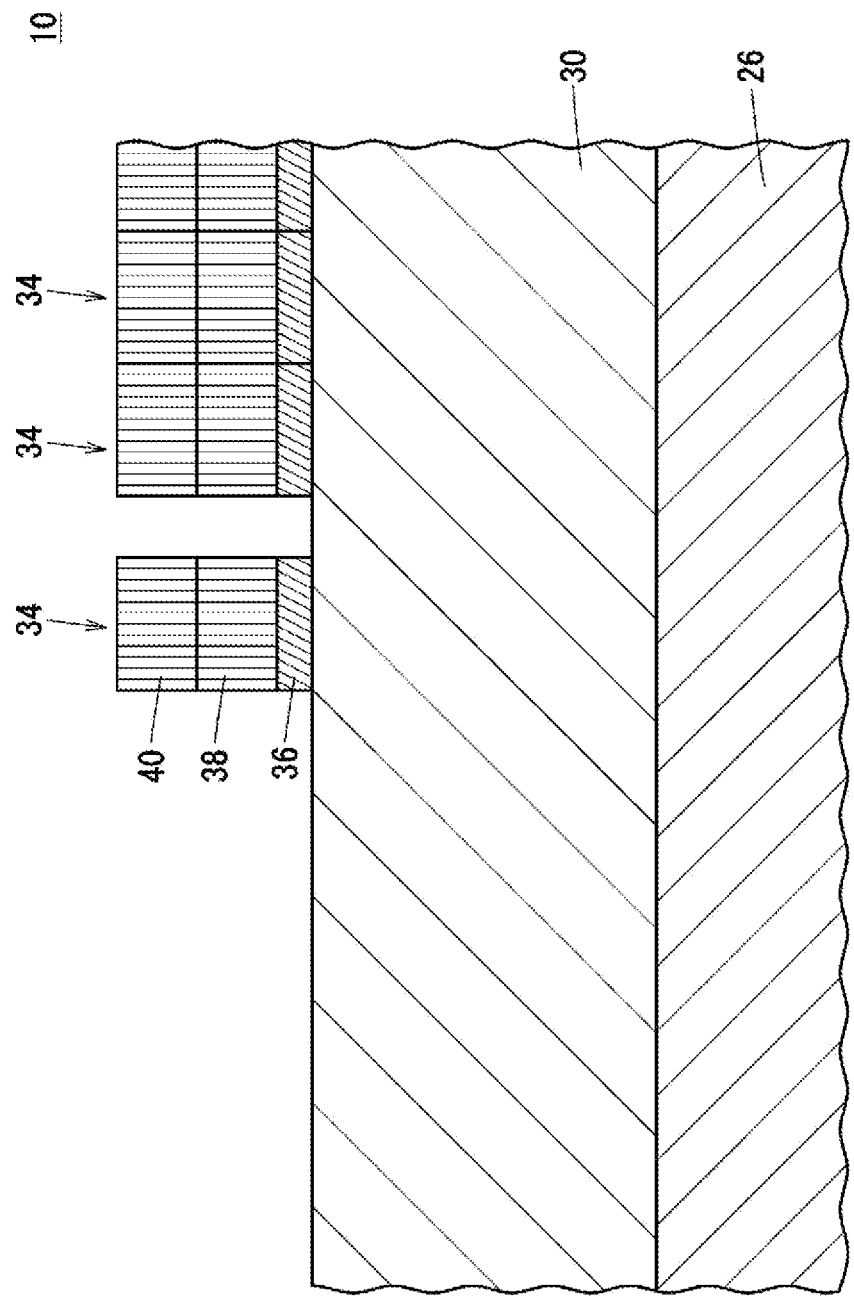
FIG. 7 is an enlarged cross-sectional view of a main part of a ring member and a permanent magnet in the mounting process.

Next, the mounting process is performed. In the mounting process, as shown in FIGS. 6 and 7, the sleeve 32 is mounted on the outer periphery of the permanent magnet 30 of the rotor shaft 22. In this embodiment, the rotor shaft 22 is inserted inside the ring members 34 via the mounting jig 42 attached to the rotor shaft 22.

Specifically, the mounting jig 42 is inserted into the ring member 34 from the small diameter part 46 thereof. Then, the ring member 34 is relatively moved toward the large diameter part 48 while sliding the inner peripheral surface of the first layer 36 of the ring member 34 and the outer peripheral surface of the tapered part 50. As a result, the inner diameter of the ring member 34 is increased according to the outer diameter of the tapered part 50. When the ring member 34 reaches the large diameter part 48, the inner diameter of the ring member 34 is increased until it reaches the outer diameter of the part of the rotor shaft 22 including the permanent magnet 30. Therefore, the part of the rotor shaft 22 including the permanent magnet 30 can be easily inserted inside the ring member 34 elastically deformed in the direction of increasing the inner diameter of the ring member 34 (hereinafter also referred to as the diameter increasing direction).

In the mounting process, the ring member 34 is disposed at one end in the axial direction of the part of the rotor shaft 22 including the permanent magnet 30 via the mounting jig 42 as described above. The ring member 34 is relatively moved toward the other end in the axial direction of the part of the rotor shaft 22 including the permanent magnet 30. At this time, the first layer 36 and the outer peripheral surface of the permanent magnet 30 are slid along the axial direction of the ring member 34 along the axial direction of the rotor shaft 22. When the ring member 34 is relatively moved with respect to the mounting jig 42 and the rotor shaft 22, for example, a press mechanism (not shown) may be used. The press mechanism abuts on the axial end surface of the ring member 34 and can press the ring member 34 along the axial direction.

By stacking the ring members 34 in the axial direction of the rotor shaft 22 as described above, a cylindrical sleeve 32 may be formed on the outer periphery of the permanent magnet 30 of the rotor shaft 22. As a result, the rotor 10 (FIG. 2) in which the permanent magnet 30 is held on the outer periphery of the rotor shaft 22 is obtained in a state where the permanent magnet 30 is pressed toward the rotor shaft 22 by the elastic restoring force of the sleeve 32.

From the above, in the method for manufacturing the rotor 10 according to this embodiment, the rotor 10 is obtained by inserting the rotor shaft 22 into the ring member 34 (sleeve 32). At this time, the amount of deformation of the ring member 34 in the diameter increasing direction increases as it is closer to the radial center of the sleeve 32. That is, the amount of deformation of the ring member 34 in the diameter increasing direction is the largest in the first layer 36 and the smallest in the third layer 40.

The first fiber-reinforced resin of the first layer 36 includes the first carbon fiber extending in a direction inclined with respect to both the axis of the rotor shaft 22 and the circumferential direction of the ring member 34. Therefore, in the first layer 36, for example, the carbon fiber is more easily elastically deformed in the diameter increasing direction than the fiber-reinforced resin layer (hoop winding layer) extending along the peripheral direction of the ring member 34. Therefore, as described above, when the rotor shaft 22 is inserted into the ring member 34, it is possible to effectively prevent the first layer 36 from breaking even if the amount of deformation of the first layer 36 in the diameter increasing direction is large.

The second fiber-reinforced resin of the second layer 38 includes the second carbon fiber extending along the circumferential direction of the ring member 34. Therefore, the second layer 38 has a larger elastic modulus (rigidity) in the diameter increasing direction than the first layer 36. Further, the third fiber-reinforced resin of the third layer 40 includes the third carbon fiber extending along the circumferential direction of the ring member 34. Further, the elastic modulus of the third layer 40 is larger than the elastic modulus of the second layer 38. That is, in the ring member 34, the elastic modulus becomes larger as the amount of deformation in the diameter increasing direction when the rotor shaft 22 is inserted into the ring member 34 becomes smaller. Therefore, the second layer 38 and the third layer 40 are also prevented from breaking when the rotor shaft 22 is inserted into the ring member 34. Further, in the ring member 34 after being mounted on the rotor shaft 22, it becomes possible to satisfactorily hold the permanent magnet 30 on the outer periphery of the rotor shaft 22 since the second layer 38 has a larger elastic modulus than that of the first layer 36, and the third layer 40 has a larger elastic modulus than that of the second layer 38.

Therefore, according to the rotor 10, the rotary machine 12, and the method for manufacturing the rotor 10 according to this embodiment, the ring member 34 can be mounted on the rotor shaft 22 while suppressing the breakage of the ring member 34, and the permanent magnet 30 can be satisfactorily pressed toward the rotor shaft 22 by the elastic restoring force of the ring member 34. As a result, the permanent magnet 30 can be satisfactorily held on the outer periphery of the rotor shaft 22.

In the rotor 10 according to the above embodiment, the elongation rate of the third layer 40 is smaller than the elongation rate of the second layer 38. In this case, even if the rotor 10 rotates at high speed and the centrifugal force applied to the permanent magnet 30 becomes large, the elongation of the third layer 40 can be suppressed. Therefore, the sleeve 32 can satisfactorily hold the permanent magnet 30 on the outer periphery of the rotor shaft 22. Further, in the second layer 38, in which the amount of deformation in the diameter increasing direction when the ring member 34 is mounted on the rotor shaft 22 is larger than that in the third layer 40, the elongation rate is larger than that of the third layer 40. Therefore, it is possible to prevent the ring member 34 from breaking when the rotor shaft 22 is inserted into the ring member 34.

In the rotor 10 according to the above embodiment, when the thickness of the first layer 36 is 1, the total thickness of the thickness of the second layer 38 and the thickness of the third layer 40 is 7.9 to 28.7.

By setting the total thickness to be 7.9 or more when the thickness of the first layer 36 is set to 1, it is possible to sufficiently secure the thicknesses of the second layer 38 and the third layer 40, which are hoop winding layers showing high strength against the centrifugal force applied to the permanent magnet 30 when the rotor 10 is rotated. As a result, the holding force of the permanent magnet 30 by the sleeve 32 can be increased.

Further, by setting the total thickness to be 28.7 or less when the thickness of the first layer 36 is set to 1, it is possible to sufficiently secure the thickness of the first layer 36, which is a helical winding layer that is unlikely to break due to deformation of the sleeve 32 in the diameter increasing direction. As a result, it is possible to effectively prevent the sleeve 32 from breaking when the sleeve 32 is attached to the rotor shaft 22.

In the rotor 10 according to the above embodiment, the angle at which the extending direction of the first carbon fiber is inclined with respect to the axis of the rotor shaft 22 is 30° to 40°.

By setting the inclination angle to 30° or more, the extending direction of the first carbon fiber can be brought closer to the extending direction of the second carbon fiber, and the bonding strength between the first layer 36 and the second layer 38 can be increased. In the mounting process, when the inner peripheral surface of the first layer 36 and the outer peripheral surface of the permanent magnet 30 are slid, a frictional force is generated between them along the axial direction of the sleeve 32. Even in this case, by setting the inclination angle to 30° or more, it is possible to effectively suppress the peeling between the first layer 36 and the second layer 38. As a result, the breakage of the ring member 34 can be effectively suppressed.

In the mounting process, when a part before diameter increase and a part whose diameter is increased appear in the axial direction of the ring member 34, a stress difference (stress distribution) is generated between the part before diameter increase and the part whose diameter is increased. In the first layer 36 in which the amount of deformation of the ring member 34 in the diameter increasing direction is large, the above stress difference is also large. By setting the inclination angle to 40° or less, it is possible to suppress the occurrence of shear stress along the orientation direction of the first carbon fiber even if the above stress difference is generated. Therefore, the breakage of the first layer 36 can be effectively suppressed. As a result, the breakage of the ring member 34 can be effectively suppressed.

In the rotor 10 according to the above embodiment, the sleeve 32 is a cylindrical member having multiple ring members 34 stacked in the extending direction of the axis of the rotor shaft 22. In this case, in the mounting process, it is possible to effectively prevent the ring member 34 from breaking when the ring member 34 is pressed in the axial direction in order to mount the ring member 34 on the rotor shaft 22.

That is, in the mounting process, the axial end surface of the ring member 34 is pressed to slide the inner peripheral surface of the first layer 36 and the outer peripheral surface of the permanent magnet 30. At this time, a frictional force is generated between the inner peripheral surface of the first layer 36 and the outer peripheral surface of the permanent magnet 30. In order to effectively suppress the breakage of the ring member 34, it is preferable to reduce the frictional force.

The frictional force increases as the contact area between the inner peripheral surface of the first layer 36 and the outer peripheral surface of the permanent magnet 30 increases. Therefore, by mounting the ring member 34 on the rotor shaft 22 to form the sleeve 32, for example, as compared with the case of mounting a sleeve 32 which is an integral cylindrical shape longer in the axial direction than the ring member 34 on the rotor shaft 22, the contact area can be reduced to reduce the frictional force. As a result, the breakage of the sleeve 32 can be effectively suppressed. As a result, the permanent magnet 30 can be better held on the outer periphery of the rotor shaft 22.

As described above, the axial length of each ring member 34 is preferably 3.3 to 12.0 mm, more preferably 6.0 to 8.0 mm. In this case, even if a shear stress along the axial direction is generated in the ring member 34 due to the above frictional force, it is possible to effectively suppress the deformation of the ring member 34 in the axial direction. Therefore, the breakage of the ring member 34 can be suppressed more effectively.

The rotary machine 12 according to this embodiment includes the rotor 10 and the stator 18 facing the outer periphery of the rotor 10 at a distance from each other.

In the method for manufacturing the rotor 10 according to the above embodiment, the sleeve 32 prepared in the providing process is multiple ring members 34, and in the mounting process, the ring members 34 form the cylindrical sleeve 32 by being stacked in the extending direction of the axis of the rotor shaft 22.

In the method for manufacturing the rotor 10 according to the above embodiment, there is a jig mounting process of mounting the mounting jig 42 at one end of the rotor shaft 22 in the extending direction before the mounting process, and in the mounting process, the rotor shaft 22 is inserted into the sleeve 32 via the mounting jig 42 attached to the rotor shaft 22, and the mounting jig 42 includes the small diameter part 46 having a diameter smaller than or equal to the inner diameter of the sleeve 32 before mounted on the rotor shaft 22, the large diameter part 48 having a diameter equal to the outer diameter of the part of the rotor shaft 22 including the permanent magnet 30, and the tapered part 50 whose diameter is gradually increased from the small diameter part 46 toward the large diameter part 48. In this case, the ring member 34 elastically deformed in the diameter increasing direction can be easily mounted on the rotor shaft 22 by a simple configuration in which the mounting jig 42 is mounted on the rotor shaft 22.

The disclosure is not limited to the above-described embodiments, and various configurations may be taken without departing from the gist of the disclosure.

For example, in the above embodiment, multiple ring members 34 are stacked in the axial direction of the rotor shaft 22 to form the cylindrical sleeve 32, but the disclosure is not particularly limited thereto. The sleeve 32 may be formed in advance in an integral cylindrical shape. Even in this case, the sleeve 32 has a first layer 36, a second layer 38, and a third layer 40, similarly to the ring member 34. Further, the sleeve 32, which has an integral cylindrical shape, may also be disposed on the outer periphery of the permanent magnet 30 of the rotor shaft 22 in the same manner as the ring member 34.

Although the method for manufacturing the rotor 10 according to the above embodiment includes a jig mounting process, it does not have to have a jig mounting process. In this case, the sleeve 32 may be mounted on the rotor shaft 22 without using the mounting jig 42.

What is claimed is:

1. A rotor comprising:
   a rotor shaft rotatable about an axis;
   a permanent magnet disposed on an outer periphery of the rotor shaft; and
   a sleeve disposed on an outer periphery of the permanent magnet and pressing the permanent magnet toward the rotor shaft,
   wherein the sleeve comprises a first layer, a second layer, and a third layer disposed concentrically in an axial direction of the sleeve,
   the first layer, the second layer, and the third layer are integrated side by side in this order from a radial center of the sleeve toward an outside,
   the first layer comprises a first fiber-reinforced resin comprising a first carbon fiber extending in a direction inclined with respect to both the axis of the rotor shaft and a circumferential direction of the sleeve,
   the second layer comprises a second fiber-reinforced resin comprising a second carbon fiber extending along the circumferential direction of the sleeve,
   the third layer comprises a third fiber-reinforced resin comprising a third carbon fiber extending along the circumferential direction of the sleeve, and
   an elastic modulus of the third layer is larger than an elastic modulus of the second layer,
   wherein a thickness of the first layer is less than a thickness of the second layer, and a thickness of the first layer is less than a thickness of the third layer.

2. The rotor according to claim 1, wherein an elongation rate of the third layer is smaller than an elongation rate of the second layer.

3. The rotor according to claim 2, wherein a total thickness of a thickness of the second layer and a thickness of the third layer is 7.9 to 28.7 times a thickness of the first layer.

4. The rotor according to claim 3, wherein an angle at which an extending direction of the first carbon fiber is inclined with respect to the axis of the rotor shaft is 30° to 40°.

5. The rotor according to claim 4, wherein the sleeve is a cylindrical member comprising a plurality of ring members stacked in an extending direction of the axis of the rotor shaft.

6. The rotor according to claim 2, wherein an angle at which an extending direction of the first carbon fiber is inclined with respect to the axis of the rotor shaft is 30° to 40°.

7. The rotor according to claim 6, wherein the sleeve is a cylindrical member comprising a plurality of ring members stacked in an extending direction of the axis of the rotor shaft.

8. The rotor according to claim 2, wherein the sleeve is a cylindrical member comprising a plurality of ring members stacked in an extending direction of the axis of the rotor shaft.

9. The rotor according to claim 3, wherein the sleeve is a cylindrical member comprising a plurality of ring members stacked in an extending direction of the axis of the rotor shaft.

10. The rotor according to claim 1, wherein a total thickness of a thickness of the second layer and a thickness of the third layer is 7.9 to 28.7 times a thickness of the first layer.

11. The rotor according to claim 10, wherein an angle at which an extending direction of the first carbon fiber is inclined with respect to the axis of the rotor shaft is 30° to 40°.

12. The rotor according to claim 11, wherein the sleeve is a cylindrical member comprising a plurality of ring members stacked in an extending direction of the axis of the rotor shaft.

13. The rotor according to claim 10, wherein the sleeve is a cylindrical member comprising a plurality of ring members stacked in an extending direction of the axis of the rotor shaft.

14. The rotor according to claim 1, wherein an angle at which an extending direction of the first carbon fiber is inclined with respect to the axis of the rotor shaft is 30° to 40°.

15. The rotor according to claim 14, wherein the sleeve is a cylindrical member comprising a plurality of ring members stacked in an extending direction of the axis of the rotor shaft.

16. The rotor according to claim 1, wherein the sleeve is a cylindrical member comprising a plurality of ring members stacked in an extending direction of the axis of the rotor shaft.

17. A rotary machine comprising:
the rotor according to claim 1; and
a stator facing an outer periphery of the rotor at a distance from each other.

18. A manufacturing method for a rotor,
wherein the rotor comprises:
a rotor shaft rotatable about an axis;
a permanent magnet disposed on an outer periphery of the rotor shaft; and
a sleeve disposed on an outer periphery of the permanent magnet and pressing the permanent magnet toward the rotor shaft, and
the manufacturing method comprises:
a providing process of providing the rotor shaft in which the permanent magnet is disposed on the outer periphery and the sleeve before mounted on the rotor shaft; and
a mounting process of mounting the sleeve on the outer periphery of the permanent magnet of the rotor shaft;
wherein the sleeve prepared in the providing process comprises a first layer, a second layer, and a third layer disposed concentrically,
the first layer, the second layer, and the third layer are integrated side by side in this order from a radial center of the sleeve toward an outside,
the first layer comprises a first fiber-reinforced resin comprising a first carbon fiber extending in a direction inclined with respect to both an axial direction of the sleeve and a circumferential direction of the sleeve,
the second layer comprises a second fiber-reinforced resin comprising a second carbon fiber extending along the circumferential direction of the sleeve,
the third layer comprises a third fiber-reinforced resin comprising a third carbon fiber extending along the circumferential direction of the sleeve,
an elastic modulus of the third layer is larger than an elastic modulus of the second,
an inner diameter of the sleeve before mounted on the rotor shaft is smaller than an outer diameter of a part of the rotor shaft comprising the permanent magnet, and
in the mounting process, the rotor shaft is inserted into the sleeve, the sleeve is elastically deformed in a direction of increasing the inner diameter of the sleeve, and the sleeve is mounted to the rotor shaft while sliding the first layer and an outer peripheral surface of the permanent magnet by making the axial direction of the sleeve be along an extending direction of the axis of the rotor shaft,
wherein a thickness of the first layer is less than a thickness of the second layer, and a thickness of the first layer is less than a thickness of the third layer.

19. The method for manufacturing the rotor according to claim 18, wherein the sleeve prepared in the providing process is a plurality of ring members, and
in the mounting process, the ring members are stacked in an extending direction of the axis of the rotor shaft to form the sleeve in a cylindrical shape.

20. The method for manufacturing the rotor according to claim 18, further comprising:
before the mounting process, a jig mounting process of mounting a mounting jig at one end in the extending direction of the rotor shaft,
wherein in the mounting process, the rotor shaft is inserted into the sleeve via the mounting jig mounted on the rotor shaft, and
the mounting jig comprises:
a small diameter part having a diameter smaller than or equal to an inner diameter of the sleeve before mounted on the rotor shaft;
a large diameter part having a diameter equal to an outer diameter of a part of the rotor shaft comprising the permanent magnet; and
a tapered part whose diameter is gradually increased from the small diameter part toward the large diameter part.

* * * * *